(12) United States Patent
Tas et al.

(10) Patent No.: US 7,975,828 B2
(45) Date of Patent: Jul. 12, 2011

(54) APPARATUS FOR PROCESSING ELONGATE PRODUCTS SUCH AS CUCUMBERS

(75) Inventors: Johannes Cornelis Joseph Tas, Nootdorp (NL); Petrus Johannes Koot, Koudekerk aan de Rijn (NL)

(73) Assignee: FPS Food Processing Systems B.V., Nootdorp (NL)

( * ) Notice: Subject to any disclaimer, the term of this patent is extended or adjusted under 35 U.S.C. 154(b) by 545 days.

(21) Appl. No.: 12/207,877

(22) Filed: Sep. 10, 2008

(65) Prior Publication Data
US 2009/0078533 A1    Mar. 26, 2009

(30) Foreign Application Priority Data

Sep. 11, 2007  (EP) ..................................... 07017714

(51) Int. Cl.
B65G 47/24  (2006.01)
(52) U.S. Cl. .................... 198/394; 198/397.06; 198/411
(58) Field of Classification Search .................. 198/394, 198/397.06, 400, 411
See application file for complete search history.

(56) References Cited

U.S. PATENT DOCUMENTS

| | | | | |
|---|---|---|---|---|
| 3,628,648 A | * | 12/1971 | McClusky | 198/383 |
| 4,648,501 A | * | 3/1987 | Grant | 198/397.04 |
| 5,052,543 A | * | 10/1991 | Hagan | 198/387 |
| 5,988,351 A | * | 11/1999 | Warkentin | 198/370.04 |
| 6,374,984 B1 | * | 4/2002 | Nagler | 198/397.06 |
| 6,889,821 B1 | * | 5/2005 | Walser | 198/778 |

FOREIGN PATENT DOCUMENTS

NL  9300980  1/1995

* cited by examiner

*Primary Examiner* — James R Bidwell
(74) *Attorney, Agent, or Firm* — Marvin Petry; Stites & Harbison PLLC

(57) ABSTRACT

Apparatus for processing generally elongate curved products having two ends and having a longitudinal axis extending in the elongate direction, in particular vegetables or fruit, for instance cucumbers, the processing comprising in succession at least: conveying the products with an endless conveyor in a conveying direction T in a substantially horizontal plane, the products positioned with their longitudinal axis substantially perpendicular to the conveying direction T; orienting these products with an orienting unit, and taking up the oriented products with a take-up unit for a further handling; wherein the orienting unit comprises two supporting points for each product, with at least one supporting point situated at some distance from an end of the product, wherein the orienting unit is configured for orienting during conveying, and wherein the products upon orienting rotate substantially about their longitudinal axis.

13 Claims, 3 Drawing Sheets

APPARATUS FOR PROCESSING ELONGATE PRODUCTS SUCH AS CUCUMBERS

Figure 1:
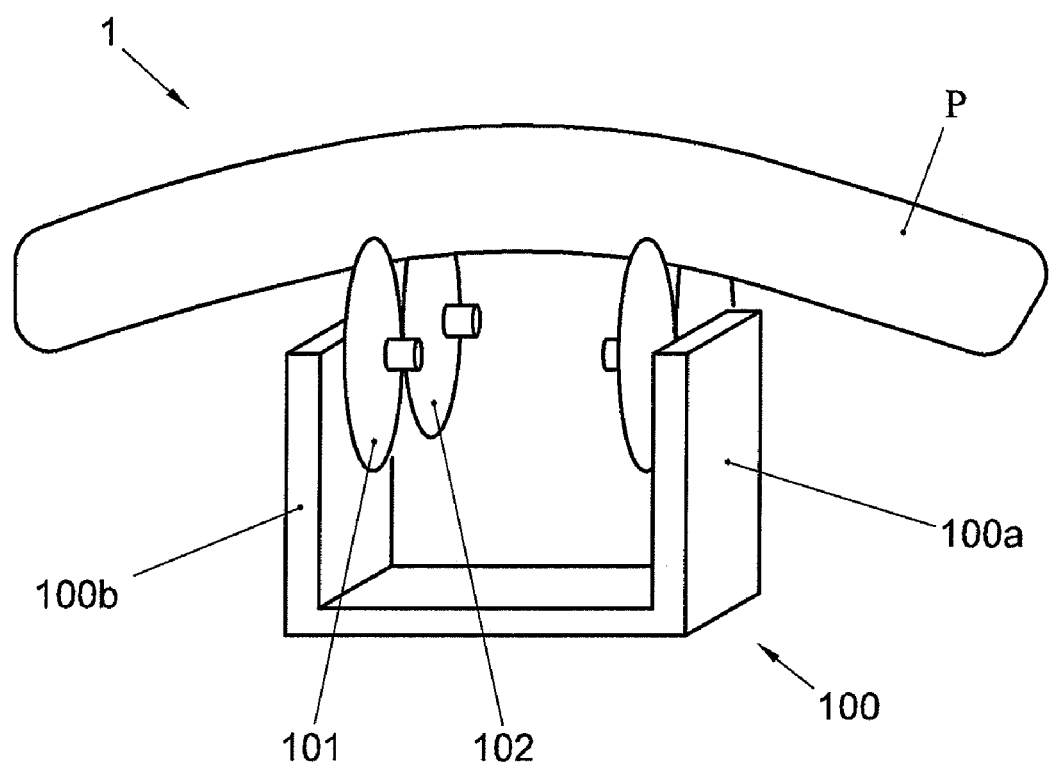

The present invention relates to an apparatus for processing generally elongate curved products having two ends and having a longitudinal axis extending in the elongate direction, in particular vegetables or fruit, for instance cucumbers, the processing comprising in succession at least: conveying the products with an endless conveyor in a conveying direction T in a substantially horizontal plane, the products positioned with their longitudinal axis substantially perpendicular to the conveying direction T; orienting these products with an orienting unit, and taking up the oriented products with a take-up unit for a further handling.

Such an apparatus is known from NL9300980. In this document it is described how cucumbers situated on small trays transverse to the conveying direction are conveyed with an endless conveyor. The conveyor comprises at least one row of such trays, which are so designed that only the central portion of a cucumber is supported. A number of cucumbers situated one after the other in a row are taken up from the trays with a corresponding number of gripper units arranged one after the other and oriented, and then taken over with a corresponding number of suction cup units and placed in a box. Orienting takes place after the cucumbers have been engaged at their ends by the gripper units, being cup-shaped holders which are freely rotatable and whose centerlines coincide with a horizontal straight line. As soon as the cucumbers come up from the trays, they will rotate about their longitudinal axis by gravity, thereby taking up the most stable position, viz. with the curvature down. As is indicated in this document, the cucumbers are mostly engaged in groups of six at a time. After engagement and orienting, this group of cucumbers are taken over with a head of suction cups, one for each cucumber. These holders move the cucumbers against each other, so that a layer of cucumbers is formed, after which the head moves this layer to a location where a box is waiting to receive this layer. In this way, several layers of cucumbers can be placed onto each other. A widely used filling is formed by two layers.

Advantageously, in this way, layers of cucumbers can be formed and stacked in a manner other than manually.

It has appeared not only that in an advantageous manner much manual packaging of cucumbers can be avoided, but also that handling cucumbers in this way may be further improved. An important shortcoming has been found to be that when large amounts of products are being supplied, the processing capacity is too low.

To remedy this problem, the apparatus of the type described in the opening paragraph hereof is characterized according to the invention in that the orienting unit comprises two supporting points for each product, with at least one supporting point being situated at some distance from an end of the product, that the orienting unit is configured for orienting during conveying, and that the products upon orienting substantially rotate about their longitudinal axis.

The invention could also be defined as follows:

Apparatus for processing generally elongate products having two ends and a curvature which determines a curvature direction and having a longitudinal axis extending in the substantially elongate direction, in particular vegetables or fruit, for instance cucumbers, comprising:

an endless conveyor arranged for conveying the products in a conveying direction T in a substantially horizontal plane, the products positioned with their longitudinal axis substantially perpendicular to the conveying direction T;

at least one orienting unit for orienting these products, each orienting unit being provided with two supports for supporting a product at two supporting positions of the product, the supports being arranged to facilitate a rotation of a product present thereon about its longitudinal axis, such that upon orienting with the orienting unit the curvature direction of successive products is oriented in the same way, the orienting unit being configured for orienting during conveying; and a take-up unit configured for taking up the oriented products for a further handling.

It has been found that in this way the processing capacity can be increased by as much as 20%.

A further notable shortcoming has been found to be that the areas which are to be subjected to suction for instance by suction cups may exhibit marked differences in height, which reduces reliability. For as soon as one or more cucumbers fail to respond to suction and are left behind, the process of supplying, orienting, transferring and packing will be interrupted. Manual intervention to restore progress is then unavoidable.

To obviate this shortcoming, the apparatus according to the invention is furthermore characterized in that the two supporting points take up a relative position such that the products upon rotation assume an end position or orientation with their curvature at the top.

In a further exemplary embodiment, the invention is characterized in that over a well-defined distance upstream of the take-up unit, the ratio of the mutual distance between the supporting points and the length of a product, measured along the longitudinal axis, is less than 0.50.

What is thus achieved in a highly suitable manner is that the products are all during conveying caused to become oriented with their curved convex side up. The conveying distance required for that purpose is then chosen such that for every product width there is sufficient time for rotation through a smaller or greater angle about the longitudinal axis. Because the mutual distance between supporting points is relatively short, this means that for the corresponding portions of the product the areas where pick-up takes place not only are approximately horizontal but all project above the conveyor to approximately the same extent as well. Pick-up is thus rendered considerably more reliable.

The apparatus according to the invention further has the features that of the two supporting points, at least one support comprises two freely rotating wheels, each rotating around a substantially horizontal axis, with the planes of the wheels closely next to each other;

that the orienting unit constitutes a conveying unit of the conveyor, the conveyor at least consisting of one row of such orienting units in the conveying direction T;

that the two supporting points are situated on two endless tracks, for instance belts, cords, or strips, with the tracks diverging to some extent in the conveying direction T, while the products, viewed in the conveying direction, are conveyed one by one with mutual distances;

that the two supporting points are situated on two endless tracks, for instance belts, cords, or strips, with the tracks converging to some extent in the conveying direction T, while the products, viewed in the conveying direction, are conveyed one by one with mutual distances;

that the two supporting points are situated on two endless tracks, for instance belts, cords, or strips, with the tracks running parallel in the conveying direction T, while the products, viewed in the conveying direction, are conveyed one by one with mutual distances;

that the products after orienting are grouped, with at least two products lengthwise moved next to and against each other forming a group;

that the products are grouped with a buffer device, whereby each product of such a group is aligned accurately perpendicular to the conveying direction T by means of a stop and then downstream is received in a position in a group holder;

that the buffer device furthermore comprises an aligning device whereby the products during grouping are all moved in their longitudinal direction as far as a stop, whereby all ends on a same side of the products form a line parallel to the conveying direction T;

that as a take-up unit a transfer device is comprised for, after the last-mentioned processing step, taking up a layer of the products and placing same in a box; and that the transfer device is a robot.

Further details and particulars of the apparatus according to the invention will be elucidated with reference to a drawing, in which FIG. 1 shows a first exemplary embodiment of an orienting unit; and FIGS. 2 to 5 show a second exemplary embodiment of an orienting unit for different situations of use thereof.

In the different figures, equal reference numerals designate an equal part.

In FIG. 1, in a schematic isometric view, an orienting unit 1 for a product P, for instance a cucumber with a clearly distinct longitudinal axis and two ends, is formed by a frame 100 with sidewalls 100 a,b, in which axes are mounted for a pair of freely rotating wheels 101, 102 on each side.

The respective rotation axes of a pair of wheels 101, 102 can be set up parallel to each other and the wheels of a pair 101, 102 can overlap each other partly, so that the two wheels form a nip in which a product part is receivable. Each pair of wheels 101, 102, more particularly the nip defined thereby, can be regarded as a supporting point or support. As soon as a curved product P is placed on the wheels, the product will rotate, for instance as a result of gravity, so as to find a physically stable balance. The two supporting points or supports have contact with supporting positions on the product and generally cover only a small surface area of such a product P. The position taken by the products is always one where the physical center of gravity comes to lie as low as possible. With a small intermediate distance between the sidewalls 100 a,b, in particular with an intermediate distance of less than 0.50 of the length of product P, the convex side will come to lie facing up as represented in FIG. 1. It will be clear to those skilled in the art that the wheels do not need to be equally large and that suitable differences in height will be chosen in the positions of the axes to make the space between the wheels of a pair as effective as possible.

A frame of this kind, for the use as intended and described above, can be fitted in as a conveying unit of an endless conveyor. Orienting unit 1 is therefore to be regarded at the same time as a conveying unit, and is for instance connected with an endless chain. It will be clear to those skilled in the art that the products P are taken off these conveying units before the endless conveying unit enters its return path. The thus oriented products P will generally all of them, or in groups and thus forming a layer, be placed in a package, for instance a box or a crate.

Figure 2:
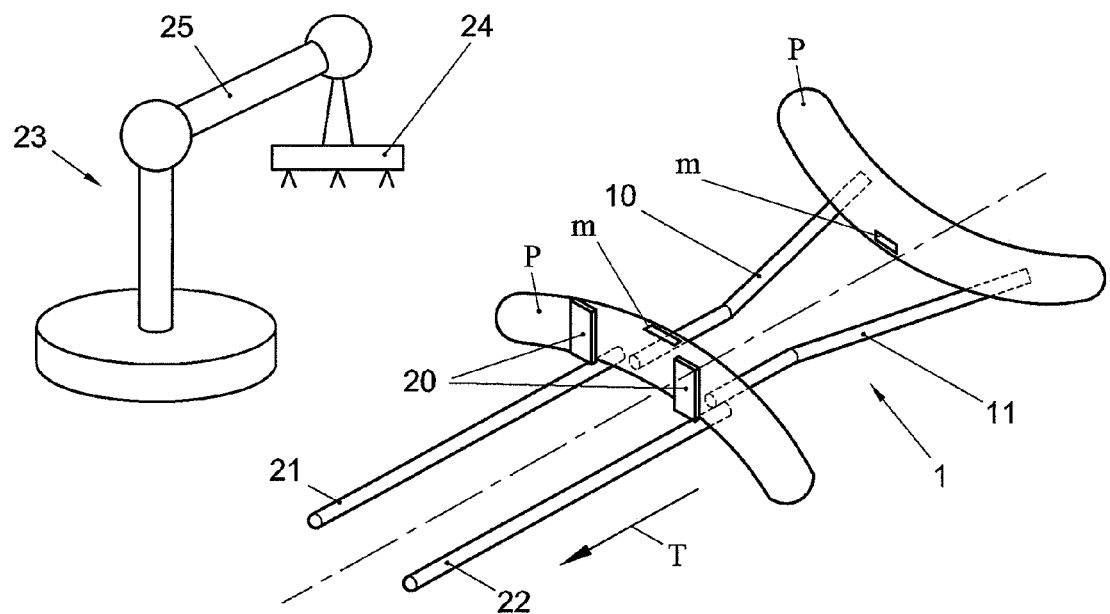
Figure 3:
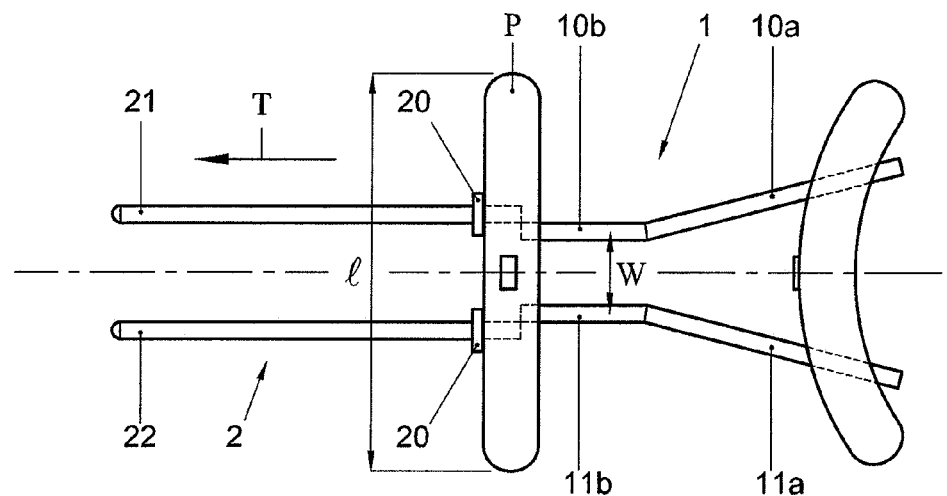
Figure 4:
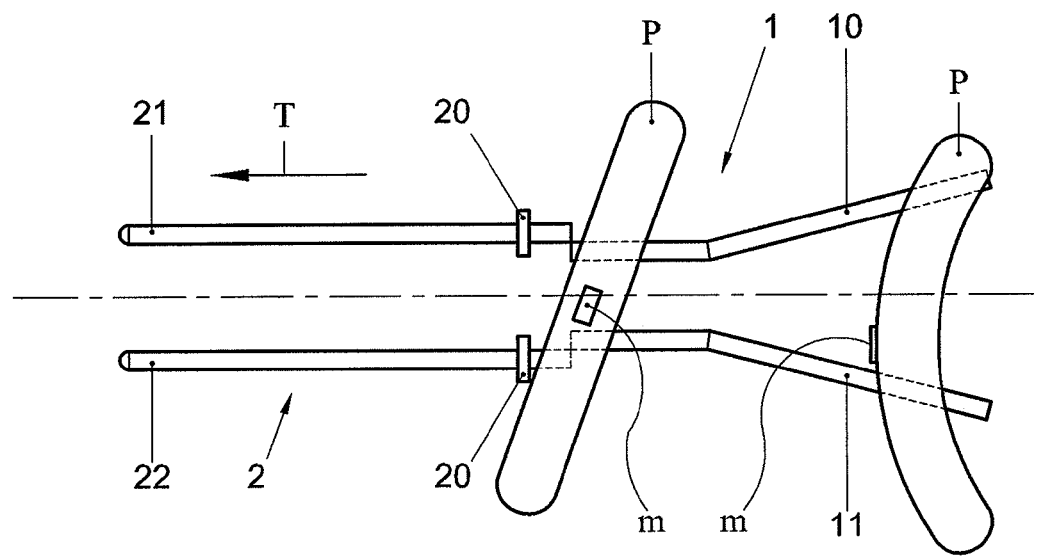
Figure 5:
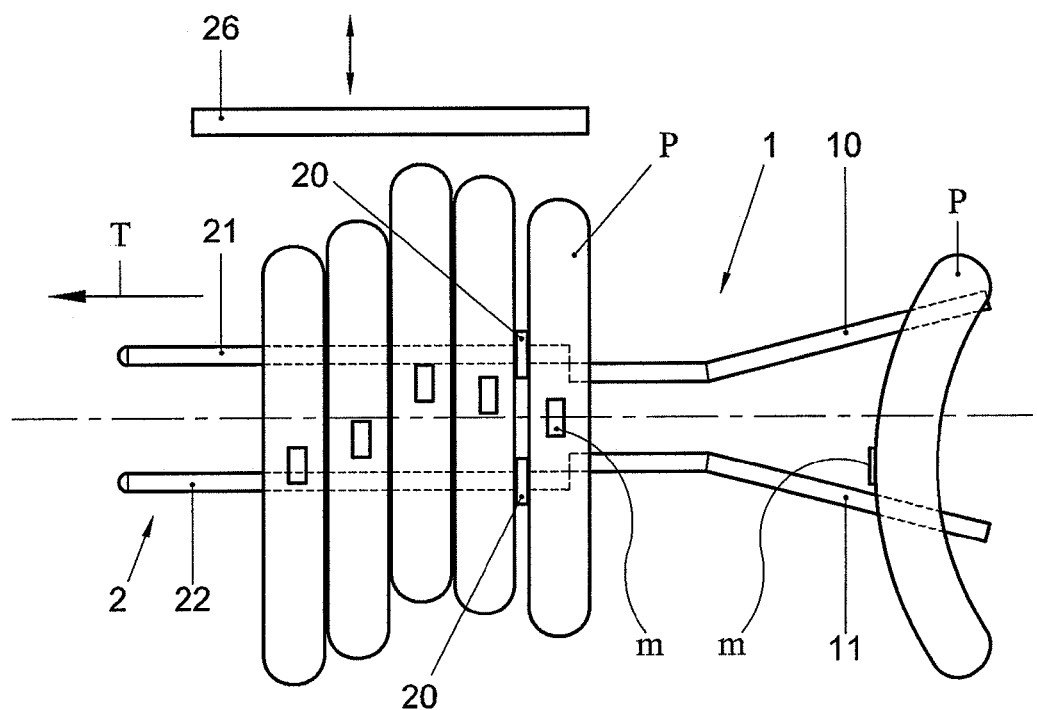

In FIGS. 2-5, a second exemplary embodiment of the invention is shown, again with an orienting unit 1. More particularly, FIG. 2 is a schematic isometric elevation, while FIGS. 3 to 5 show schematic top plan views.

The products P, for instance cucumbers, are disposed on tracks 10 a,b, 11 a,b, to be conveyed in a conveying direction T. On the products P, a marking m is represented to illustrate the manner of orientation, more particularly the manner of rotation. The tracks 10 a,b, 11 a,b, form supporting points or supports at the location of their contact with a product P to be oriented. Here too, the two supporting points have contact with supporting positions on the product and generally cover only a small surface area of such a product P. To those skilled in the art, it will be clear that the tracks 10 a,b and 11 a,b are generally not-too-wide strips, cords, or belts, which allow rotation, viz. rotation of the product about its longitudinal axis until a stable orientation or position has been attained, and at the same time provide sufficient support. Conveying of the products P along the tracks 10 a,b, 11 a,b can be effected by a push member engaging the products P and traveling in the conveying direction T. Conveying can also be effected by designing the tracks 10 a,b, 11 a,b themselves as a conveying medium, for instance in the form of a belt, chain or like drivable object.

Clearly represented for example in the top plan view according to FIG. 3 is a length l of a product P and the width w between the tracks 10b and 11b, where, again, w<0.50 l, analogously to the distances according to the first exemplary embodiment. Clearly, a path has been chosen where the tracks 10 a,b and 11 a,b converge. To those skilled in the art, it will be clear that the lengths of these paths are chosen such that upon progressive movement of the tracks, the products will rotate if necessary and, as a result of gravity, as already indicated above, be oriented again with their convex side up.

In FIGS. 2 and 3 it is represented how the orienting process proceeds for product disposed perpendicularly to the conveying direction T. A product P, after being moved, e.g. from a belt with a transition brush or star wheel, e.g. from a sorting machine where the products have been sorted according to weight, to a well-defined track or row, is initially on its side and at some point, as a result of the convergence of the tracks 10 a,b and 11 a,b, will seek and find a new balance. In FIG. 4, on the other hand, the convex side is caused to turn up but the skewed position is substantially not adjusted.

In a next step, use is made of a buffer device 2, with stops 20, and buffer tracks 21, 22. As in the orienting unit 1, these tracks can also be designed in a known manner as strips, belts, or cords. Furthermore, in a known manner these tracks can be part of an endless conveyor, which because of its function is separated from that of the orienting unit 1. As soon as upon advancement in the conveying direction T a skewed product P on one of its sides butts against a stop 20, the other side will be carried along against the second stop, so that an accurate positioning with the longitudinal axis perpendicular to the conveying direction T is obtained.

As already indicated above, such products P are mostly taken up in groups, layer by layer, and placed in boxes. To that end, the buffer device is provided, in a manner known to those skilled in the art, with layer holders, in which each product making up a group or a layer is held in place for a shorter or longer period of time, depending on the amount of supply of the products. The position of these layer holders is such that the products P will lie in close mutual abutment in order for the space in a box to be utilized optimally. Upon supply of a next product, the buffer conveyor 2 will be moved over a short distance in the conveying direction T to allow a next product in turn to assume the correct position. Such a distance is generally settable and depends on the size of the products P.

In FIG. 5, such a layer is represented. In general, a layer consists of five or six products P, depending on the size of a box or crate. Furthermore, it is indicated in the figure that following the taking up of the perpendicular position and subsequent placement in a layer holder, the stops 20 are moved clear of the progressive path of the products P. FIG. 2 shows a take-up unit. This can comprise a transfer device such as for instance a robot 25 with a suction head 24. Precisely by virtue of the orientation with the curvature facing up, with the respective heights being very proximate to each other, pick-up with a suction head with predetermined sizes, including the heights, will be highly suitable.

A further device may be provided which, for instance during further placement towards the layer holders, moves the ends of each product to one and the same side, thereby forming a layer with the ends on one side of the buffer device 2 aligned and all projecting equally far. The device 26 can for instance comprise a plate 26 (see FIG. 5) movable against the ends of the products P to align these ends. Preferably, the operations of further placement and alignment take place simultaneously so as to obtain, here too, the advantage of saving time and hence a greater processing capacity. More particularly, the aim will be to obtain an optimum cycle time for the entire process of orienting, buffering and transfer.

It will be clear to those skilled in the art that small modifications are understood to fall within the scope of the claims.

The invention claimed is:

1. An apparatus for processing generally elongate curved products having two ends and having a longitudinal axis extending in the elongate direction, in particular vegetables or fruit, for instance cucumbers, the processing comprising in succession at least,
   conveying the products with an endless conveyor in a conveying direction T in a substantially horizontal plane, the products positioned with their longitudinal axis substantially perpendicular to the conveying direction T,
   orienting these products with an orienting unit, and
   taking up the oriented products with a take-up unit for a further handling, characterized in that
   the orienting unit comprises two supporting points for each product, with at least one supporting point situated at some distance from an end of the product,
   that the orienting unit is configured for orienting during conveying, and
   that the products upon orienting rotate substantially about their longitudinal axis.

2. An apparatus according to claim 1, characterized in that the two supporting points take up a relative position such that the products upon rotation take up an end position or end orientation with their curvature at the top.

3. An apparatus according to claim 2, characterized in that over a well-defined distance upstream of the take-up unit, the ratio of the mutual distance between the supporting points and the length of a product measured along the longitudinal axis is less than 0.50.

4. An apparatus according to claim 1, characterized in that of the two supporting points at least one support is situated between a pair of freely rotating wheels, each rotating about a substantially horizontal axis, with the wheel planes closely next to each other, so that the two wheels define a nip forming a supporting point.

5. An apparatus according to claim 4, characterized in that the orienting unit forms a conveying unit of said conveyor, the conveyor at least consisting of one row of such orienting units in said conveying direction T.

6. An apparatus according to claim 1, characterized in that the two supporting points are situated on two endless tracks, for instance belts, cords, or strips, with the tracks diverging to some extent in the conveying direction T, wherein the products, viewed in the conveying direction, are conveyed one by one with mutual distances.

7. An apparatus according to claim 1, characterized in that the two supporting points are situated on two tracks, for instance endless tracks such as belts, cords, or strips, with the tracks converging to some extent in the conveying direction T, wherein the products, viewed in the conveying direction, are conveyed one by one with mutual distances.

8. An apparatus according to claim 1, characterized in that the two supporting points are situated on two tracks, for instance endless tracks such as belts, cords, or strips, with the tracks running parallel in the conveying direction T, wherein the products, viewed in the conveying direction, are conveyed one by one with mutual distances.

9. An apparatus according to claim 1, characterized in that the products after orienting are grouped, with at least two products moved lengthwise next to and against each other forming a group.

10. An apparatus according to claim 9, characterized in that the products are grouped with a buffer device, wherein each product of such a group is oriented to be accurately perpendicular to the conveying direction T by means of a stop and thereupon is downstream received in a layer holder.

11. An apparatus according to claim 9, characterized in that the buffer device furthermore comprises an aligning device whereby the products during grouping are all moved in the longitudinal direction thereof as far as a stop whereby all ends on a same side of the products form a line parallel to the conveying direction T.

12. An apparatus according to claim 1, characterized in that as a take-up unit a transfer device is comprised for, after the last-mentioned processing step, taking up a layer of the products and placing same in a box.

13. An apparatus according to claim 12, characterized in that the transfer device is a robot.

* * * * *